United States Patent
Seo et al.

(10) Patent No.: US 11,249,920 B2
(45) Date of Patent: Feb. 15, 2022

(54) NON-VOLATILE MEMORY DEVICE USING EFFICIENT PAGE COLLECTION MAPPING IN ASSOCIATION WITH CACHE AND METHOD OF OPERATING THE SAME

(71) Applicant: KNU-INDUSTRY COOPERATION FOUNDATION, Gangwon-do (KR)

(72) Inventors: Seok Bin Seo, Gangwon-Do (KR); Wan Il Kim, Seoul (KR); Jin Young Kim, Gangwon-do (KR); Se Jin Kwon, Gangwon-Do (KR)

(73) Assignee: KNU-INDUSTRY COOPERATION FOUNDATION, Gangwon-do (KR)

( * ) Notice: Subject to any disclaimer, the term of this patent is extended or adjusted under 35 U.S.C. 154(b) by 0 days.

(21) Appl. No.: 16/671,962

(22) Filed: Nov. 1, 2019

(65) Prior Publication Data

US 2020/0210345 A1    Jul. 2, 2020

(30) Foreign Application Priority Data

Dec. 31, 2018 (KR) .......................... 10-2018-0173932

(51) Int. Cl.
*G06F 12/1009* (2016.01)
*G06F 12/0891* (2016.01)
(Continued)

(52) U.S. Cl.
CPC ........ *G06F 12/1009* (2013.01); *G06F 3/0604* (2013.01); *G06F 3/0656* (2013.01);
(Continued)

(58) Field of Classification Search
CPC .... G06F 3/06004; G06F 3/0608; G06F 3/064; G06F 3/0656; G06F 3/0658;
(Continued)

(56) References Cited

U.S. PATENT DOCUMENTS 7,769,944 B2    8/2010    Luo et al.
7,865,658 B2    1/2011    Lasser et al.
(Continued)

FOREIGN PATENT DOCUMENTS

KR    10-1060258 B1    8/2011
KR    10-1919653 B1    11/2018

OTHER PUBLICATIONS

Guanying Wu, Xubin He, and Ben Eckart. 2012. An adaptive write buffer management scheme for flash-based SSDs. ACM Trans. Storage 8, 1, Article 1 (Feb. 2012), 24 pages. DOI:https://doi.org/10.1145/2093139.2093140 (Year: 2012).*

(Continued)

*Primary Examiner* — Reginald G Bragdon
*Assistant Examiner* — Aaron D Ho
(74) *Attorney, Agent, or Firm* — United One Law Group LLC; Kongsik Kim; Jhongwoo Peck

(57) ABSTRACT

Disclosed are a non-volatile memory device and a method of operating the non-volatile memory device. A non-volatile memory device in which m logical pages are stored in a single physical page includes: a plurality of registers configured to be included in a flash translation layer (FTL) and to store at least part of the data of a write command received from a file system; and a controller configured to control operations of the plurality of registers based on the write command; wherein each of the plurality of registers is further configured to have a storage space associated with the size of the m logical pages; and wherein the controller is further configured to program the data of the write command into the non-volatile memory device and to store the data of the write command in the plurality of registers.

9 Claims, 4 Drawing Sheets

(51) Int. Cl.
*G06F 3/06* (2006.01)
*G06F 9/30* (2018.01)

(52) U.S. Cl.
CPC .......... *G06F 3/0658* (2013.01); *G06F 3/0659* (2013.01); *G06F 3/0679* (2013.01); *G06F 9/3013* (2013.01); *G06F 12/0891* (2013.01)

(58) Field of Classification Search
CPC ................. G06F 3/0659; G06F 3/0679; G06F 2003/0691; G06F 2003/0695; G06F 12/0246; G06F 12/0891; G06F 12/1009; G06F 2212/7201; G06F 9/3013
USPC .................................................. 711/100, 202
See application file for complete search history.

(56) References Cited

U.S. PATENT DOCUMENTS

| | | | |
|---|---|---|---|
| 7,882,299 B2 | 2/2011 | Conley et al. | |
| 7,953,954 B2 | 5/2011 | Ly et al. | |
| 8,832,353 B2 | 9/2014 | Hsu et al. | |
| 9,177,638 B2 | 11/2015 | Danilak et al. | |
| 2016/0306552 A1* | 10/2016 | Liu | G06F 3/0679 |
| 2016/0364142 A1* | 12/2016 | Kanno | G06F 3/064 |
| 2017/0177276 A1 | 6/2017 | Delaney et al. | |
| 2017/0242583 A1* | 8/2017 | Yang | G06F 3/0659 |
| 2017/0329539 A1* | 11/2017 | Ko | G06F 12/0246 |
| 2019/0303041 A1* | 10/2019 | Kim | G06F 13/22 |
| 2021/0034301 A1* | 2/2021 | Zhou | G06F 12/0246 |

OTHER PUBLICATIONS

Q. Wei, C. Chen and J. Yang, "CBM: A cooperative buffer management for SSD," 2014 30th Symposium on Mass Storage Systems and Technologies (MSST), Santa Clara, CA, USA, 2014, pp. 1-12, doi: 10.1109/MSST.2014.6855545. (Year: 2014).*

* cited by examiner

"Related Art"

FIG. 3

```
INOUT: write (LPN, data, SIZE);
1.   WAIT: IF 'write request' is EQUAL 0 GOTO WAIT
2.       IF 'LPN' IS EQUAL '1st register' THEN
3.           'data write in 1st register'
4.           IF 1st register IS FULL THEN
5.               'write data of 1st register in flash memory' AND
6.               'flush 1st register'
7.       ELSE THEN
8.           'data write in 2nd register
9.           IF 2nd register IS FULL THEN
10.              'write data of 2nd register in flash memory' AND
11.              'flush 2nd register'
12.          ELSE IF 'idle check 2nd register()'
13. GOTO WAIT
```

FIG. 4

```
<IDLE CHECK 2ND REGISTER() >
1.  IF  '2nd register non-update' IS MORE THAN x or 'device
    time' IS EQUAL 'idle-time' THEN
2.      'write data of 2nd register in flash memory' AND
3.      'flush 2nd register'
```

NON-VOLATILE MEMORY DEVICE USING EFFICIENT PAGE COLLECTION MAPPING IN ASSOCIATION WITH CACHE AND METHOD OF OPERATING THE SAME

CROSS-REFERENCE TO RELATED APPLICATION

This application claims under 35 U.S.C. § 119(a) the benefit of Korean Patent Application No. 10-2018-0173932 filed on Dec. 31, 2018, which is incorporated herein by reference.

TECHNICAL FIELD

The present invention relates generally to a non-volatile memory device including a multi-bit cell or a multi-level cell and a method of operating the non-volatile memory device, and more specifically to a method which is capable of efficiently operating a non-volatile memory device in which two or more pieces of logical bit information are stored in a single physical cell, such as a multi-level cell (MLC), a tri-level cell (TLC), or a quad-level cell (QLC).

The present invention was derived from the research conducted as part of the Local University Outstanding Scientist Support Project sponsored by the Korean Ministry of Education and National Research Foundation of Korea [Project Management Number: 1345276641; Project Name: Efficient System Software Based on Hybrid Non-volatile Memory Architecture for Implementation of High-Reliability Smart IT Environment].

BACKGROUND ART

Flash memory is classified into various types of semiconductor chips, such as a single-level cell (SLC), a multi-level cell (MLC), a tri-level cell (TLC), and a quad-level cell (QLC), according to the number of bits which can be stored in a single memory cell. Generally, an SLC is regarded as a high-end cell, an MLC is regarded as a mid-grade cell, and a TLC and a QLC are regarded as low-end cells.

Recently, due to the high capacity of storage systems, the solid state disk (SSD) market is rapidly growing. In line with this trend, NAND flash memory manufacturers are conducting research and development for the application of TLC and QLC techniques having high data density in order to manufacture low-cost, high-capacity SSDs.

NAND flash memory is generally composed of pages, i.e., sets of sectors which are units of read/write operations, and several pages are assembled to form blocks which are units of erase operations. Furthermore, there is provided an erase-before-write feature in which a block erase operation needs to precede the update of the data of a page.

In this case, the fact that the units of operations based on the time, cost, and type of operation between read/write/erase operations are asymmetrical needs to be taken into consideration in order to perform the efficient control of a NAND flash memory device. In this regard, the importance of a flash translation layer (FTL) is increasing more and more.

The fact that recently proposed QLC NAND flash memory has higher data density than an SLC, an MLC and a TLC but has slower read, write and erase operations is an important point to take into consideration in connection with an FTL. The storage space of each page in QLC NAND flash memory is increasing and the overall performance of QLC NAND flash memory is deteriorating. Therefore, when the read/write pattern trace technique which is applied to a file system used in a conventional operating system is applied to a QLC without change, problems arise in that space utilization is decreased, the number of write operations is increased, and ultimately the service life of QLC NAND flash memory is shortened.

Korean Patent No. 10-1060258 entitled "Multi-Level Cell Program Method for Non-volatile Memory Device" and Korean Patent No. 10-1919653 entitled "Methods and Devices for Preventing Lower Page Deformation in Data Storage Devices' propose a configuration of managing a conventional page buffer (a buffer memory which stores and maintains data in order to program data into flash memory) in conjunction with an FTL in order to manage the service life of multi-level cell memory from the transition from an SLC to an MLC as well as in a QLC.

The related technologies disclose a configuration of sequentially storing and programming data until the data of m logical pages fills a page buffer (Korean Patent No. 10-1060258), and a configuration in which a buffer is coupled to a controller and write data is accumulated in a memory buffer 504 and a Store Register 203 until a complete F-page is constructed (Korean Patent No. 10-1919653).

FIG. 1 is a diagram showing the configuration of Korean Patent No. 10-1919653 of the above-described related art documents, and shows a configuration in which write data is accumulated in the Store Register 203 until one F-page is completely constructed for a multi-bit cell.

The related art documents assume that the data of write commands transferred from a host system or an operating system has spatial locality. In particular, Korean Patent No. 10-1060258 of the related art documents focuses only on physically programming write data when write data completely fills m logical pages. Furthermore, Korean Patent No. 10-1919653 of the related art documents focuses on performing a backup operation using a non-volatile RAM (NV-RAM) so as not to lose temporary data stored in a register/store/buffer when power supply is not smoothly performed during operation.

In practice, although the data of a write command transferred from a host system or an operating system may be burst data, the data of a write command may be small-sized data related to the update of the system. Accordingly, the configurations of the above-described related art documents still have problems in which space utilization is low, the number of write operations is large, and ultimately the service life of MLC/TLC/QLC NAND flash memory is shortened. This phenomenon will become more prominent as data density increases as in a TLC and a QLC.

SUMMARY OF THE DISCLOSURE

Korean Patent Nos. 10-1060258 and 10-1919653 P introduce a configuration which stores data in a page buffer or cache until data to be stored in a multi-level cell satisfies the size of m complete logical pages. However, the related technologies of these related art documents assume that the data of write commands transferred from a host system or an operating system has spatial locality, and do not take into account the fact that the data of write commands is actually and frequently the updates of small-sized data related to the updates of the system.

In other words, the related technologies of the related art documents are not fully applicable to a complete TLC or QLC device. The related technologies introduced in the related art documents are technologies which are difficult to apply unless there is a separate SLC configured to store data on a system update.

In particular, when the logical address of a write data transferred from a file system is not associated with the logical address of data currently stored in a page buffer or cache, the data currently stored in the page buffer or cache needs to be programmed into flash memory and the page buffer or cache needs to be emptied. In this case, unnecessary write operations occur, and thus problems arise in that the utilization of space is reduced, the number of write operations is increased, and ultimately the service life of flash memory is shortened.

The present invention has been conceived to overcome the above-described problems of the related technologies, and an object of the present invention is to propose a flash translation layer (FTL) which efficiently manages a flash memory device having a multi-level high data density by taking into consideration the actual write operation situation of a flash memory in which write commands transmitted from a host system, an operating system, or a file system are frequently related to the update information of the system, and a method of operating a flash memory device by using the flash translation layer (FTL).

An object of the present invention is to reduce the number of unnecessary write operations and increase space utilization in a flash memory device having a multi-level high data density by using registers having a parallel dual structure in an FTL level.

Furthermore, an object of the present invention is to solve the problem caused by the limitation of the update of a cache/register by proposing a criterion for the determination of the idle time of a cache/register.

An object of the present invention is to increase service life in a flash memory device having a multi-level high data density by taking into consideration both the spatial locality and temporal locality of write data in an FTL level.

In accordance with an aspect of the present invention, there is provided a non-volatile memory device in which m logical pages are stored in a single physical page, the non-volatile memory device including: a plurality of registers configured to be included in a flash translation layer (FTL) and to store at least part of the data of a write command based on the write command received from a file system; and a controller configured to control operations of the plurality of registers based on the write command received from the file system; wherein each of the plurality of registers is further configured to have a storage space associated with the size of the m logical pages; and wherein the controller is further configured to, when the size of the data of the write command is equal to or larger than a threshold size associated with the size of the m logical pages, program the data of the write command into the non-volatile memory device and to, when the size of the data of the write command is smaller than a threshold size associated with the size of the m logical pages, store the data of the write command in the plurality of registers.

The plurality of registers may be further configured to include a first register configured to store data which meets a logical address locality condition and a second register configured to be included in the flash translation layer and to store data which does not meet the logical address locality condition, and each of the first and second registers may be further configured to have a storage space associated with the size of the m logical pages.

The controller may be further configured to, when the logical address of the data of the write command and the logical address of data stored in the first register meet the logical address locality condition, store the data of the write command, received from the file system, in the first register, and the controller may be further configured to, when a logical address of the data of the write command and a logical address of data stored in the first register do not meet the logical address locality condition, store the data of the write command in the second register.

When storing the data of the write command in the first register because the logical address of the data of the write command and the logical address of the data stored in the first register meet the logical address locality condition, the controller may be further configured to, when there is no sufficient space to store the data of the write command in the first register, program the data, stored in the first register, into the non-volatile memory device, erase the data stored in the first register, and store the data of the write command in the first register.

When storing the data of the write command in the second register because the logical address of the data of the write command and the logical address of the data stored in the first register do not meet the logical address locality condition, the controller may be further configured to, when there is no sufficient space to store the data of the write command in the second register, program the data, stored in the second register, into the non-volatile memory device, erase the data stored in the second register, and store the data of the write command in the second register.

When storing the data of the write command in the second register because the logical address of the data of the write command and the logical address of the data stored in the first register do not meet the logical address locality condition, the controller may be further configured to, when the second register meets an idle time condition, program the data, stored in the second register, into the non-volatile memory device, erase the data stored in the second register, and store the data of the write command in the second register.

The idle time condition may be a case in which a predetermined threshold idle time has elapsed after the data stored in the second register is updated, or a case in which the number of times the data of the write command is transferred to the first register after the data stored in the second register is updated is equal to or larger than a predetermined threshold idle number.

In accordance with an aspect of the present invention, there is provided a method of operating a non-volatile memory device in which m logical pages are stored in a single physical page, wherein the non-volatile memory device includes a plurality of registers configured to be included in a flash translation layer (FTL) and to store at least part of the data of a write command based on the write command received from a file system and a controller configured to control operations of the plurality of registers based on the write command received from the file system, wherein each of the plurality of registers is further configured to have a storage space associated with the size of the m logical pages, wherein the controller is further configured to, when a size of the data of the write command is equal to or larger than a threshold size associated with the size of the m logical pages, program the data of the write command into the non-volatile memory device and to, when a size of the data of the write command is smaller than the threshold size associated with the size of the m logical pages, store the data of the write command in the plurality of registers, and wherein the method includes storing, by the controller, the data of the write command, received from the file system, in the first register when the logical address of the data of the write command and the logical address of data stored in the first register meet the logical address locality condition and storing, by the controller, the data of the write command in a second register when a logical address of the data of the write command and a logical address of data stored in the first register do not meet the logical address locality condition.

BRIEF DESCRIPTION OF THE DRAWINGS

The above and other objects, features and advantages of the present invention will be more clearly understood from the following detailed description taken in conjunction with the accompanying drawings, in which:

FIG. 3 shows an example of pseudo-code which implements a method of operating a non-volatile memory device using page collection mapping according to an embodiment of the present invention; and FIG. 4 shows an example of pseudo-code showing one step of the operating method of FIG. 3 in greater detail.

DETAILED DESCRIPTION OF THE DISCLOSURE

Embodiments of the present invention will be described in detail below with reference to the accompanying drawings. In the following description, when it is determined that a detailed description of a known component or function may unnecessarily make the gist of the present invention obscure, it will be omitted.

In the present invention, a Flash Translation Layer (FTL) is executed by program instructions which are executed by a memory controller. The memory controller manages address mapping in an FTL, i.e., a virtual logical layer, the movement of data in a flash memory device attributable to the difference between a physical address and a logical address, the duplication of data, the update of data, and the erasing of blocks, etc.

In addition, the memory controller may perform the sorting and classification of write data executed in the FTL, and may manage information about mapping between logical addresses and physical addresses based on the sorting and classification of write data. In this case, in order to sort and classify write data, the memory controller of the present invention may use a dual-structure cache or register.

Figure 1:
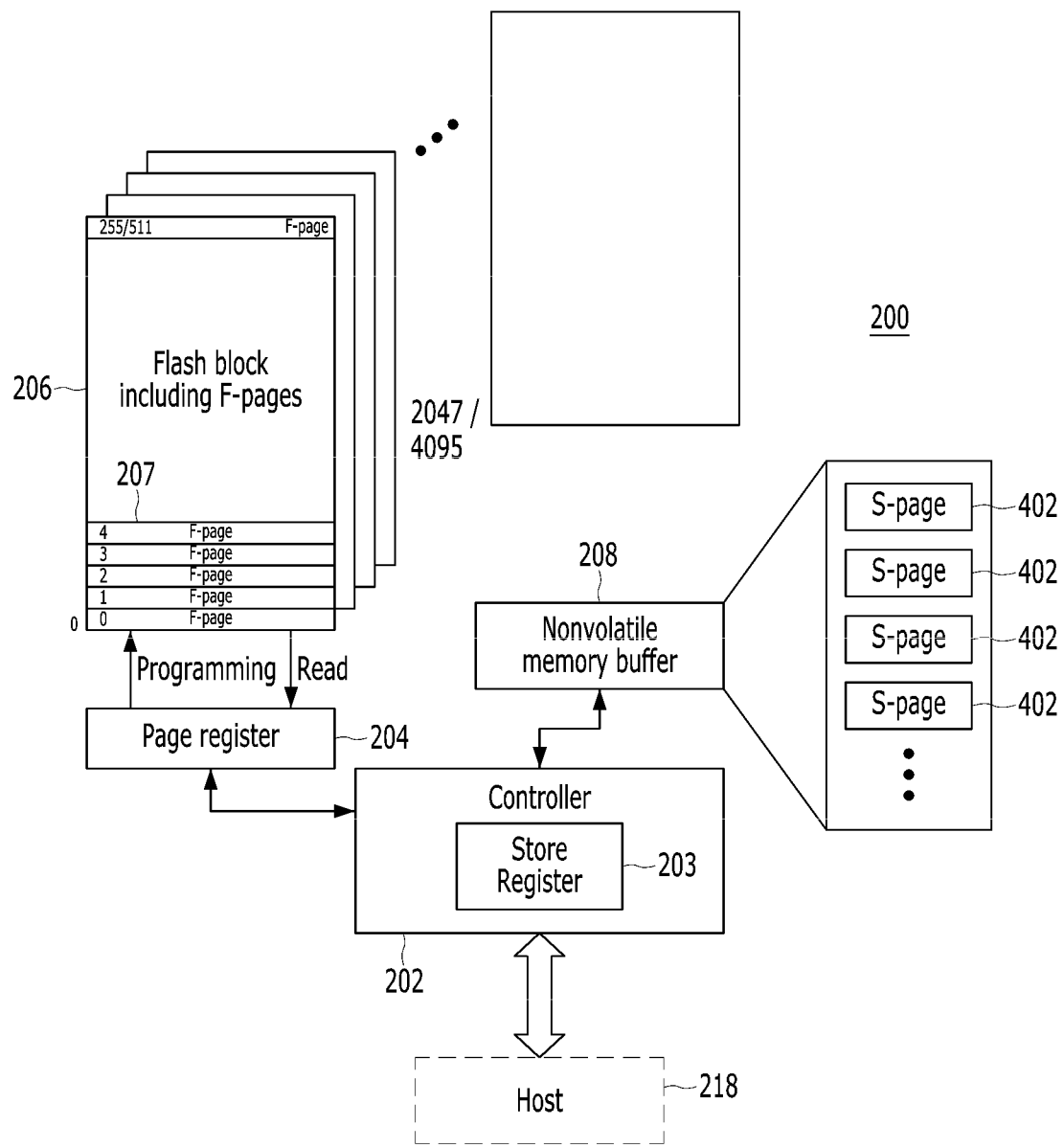
FIG. 1 is a diagram showing an FTL-level cache structure in a conventional multi-level cell-based NAND flash storage device.
Figure 2:
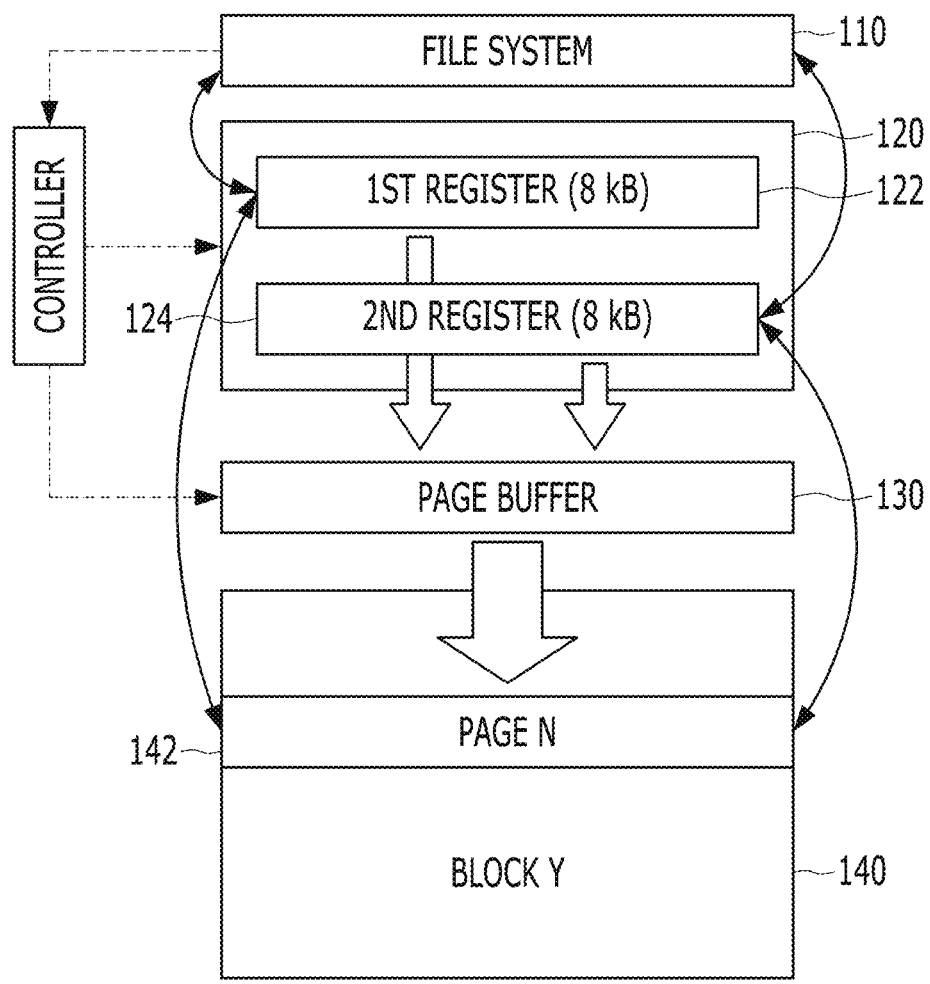
FIG. 2 is a view showing the structure of a non-volatile memory device using page collection mapping according to an embodiment of the present invention.

FIG. 2 is a view showing the structure of a non-volatile memory device using page collection mapping according to an embodiment of the present invention.

The non-volatile memory device includes a flash translation layer 120, a page buffer 130, and a physical block 140. A controller (not shown) chiefly controls operations executed in the flash translation layer 120, and manages mapping information required for the control.

Write commands transmitted from a file system 110 are sorted and classified in the flash translation layer 120 by the controller. In this case, at least two registers 122 and 124 are included in the flash translation layer 120.

It is assumed that m logical pages are stored in a single physical page 142 in the physical block 140. In this case, m is a natural number which is equal to or larger than 2.

At least part of the data of the write command is stored in the first register 122 and the second register 124 based on a write command received from the file system 110. The controller controls the operations of the first register 122 and the second register 124 based on the write command received from the file system 110. Each of the first register 122 and the second register 124 has a storage space associated with the size of m logical pages.

For example, assuming that m=4 and each logical page is 2 kB, the storage space of each of the registers 122 and 124 may be 8 kB. The controller may control the operations of the first register 122, the second register 124, and the page buffer 130 to program write data into the physical page 142 in the physical block 140 of the non-volatile memory device based on a threshold size associated with the size of the storage space associated with the m logical pages.

The threshold size associated with the size of the storage space associated with the m logical pages may be equal to the size of the storage space of each of the registers 122 and 124, or may be slightly different. For example, when the size of the storage space of each of the registers 122 and 124 is 8 kB as in the present embodiment, the threshold size may be any value in the range of 6 kB to 8 kB. In an embodiment, when the size of the data of a write operation is 6 kB or more, it is assumed that the data has spatial locality and is sufficiently high in space utilization relative to the m logical pages, and thus control may be performed such that the data is transferred to the page buffer 130 and is physically programmed into the physical page 142 of the flash memory device. Burst data is likely to have the address of the same logical page or an adjacent logical page and is advantageously delivered to the page buffer 130 at once. In this case, even when the page buffer 130 does not separately store or manage information about the mapping between a logical address and a physical address, information about the storage and management of write data may be sufficiently managed by the controller of the flash translation layer (FTL).

When the size of the write data is smaller than the threshold size, e.g., 6 kB, it is assumed that the data is not yet sufficiently high in space utilization relative to the m logical pages, and thus the controller does not transfer the write data to the page buffer 130 but store the write data in the registers 122 and 124.

The first register 122 and the second register 124 are configured to operate in parallel with each other. The data of the write operation in the case where a logical address locality condition is met may be stored in the first register 122, and the data of the write operation in the case where the logical address locality condition is not met may be stored in the second register 124. Thereafter, whether the write data of a new write command received from the file system 110 meets the logical address locality condition may be determined by comparison with the logical address of the data stored in the first register 122. In this case, the logical address locality condition may be determined based on an association between logical addresses. For example, whether or not the difference between logical addresses to be compared is smaller than m or whether or not the upper bits of logical addresses are the same may be set as a criterion for the determination of spatial locality.

When the size of the data of the write command is equal to or larger than the threshold size associated with the size of the m logical pages, the controller performs an operation based on the first register 122. When the size of the data of the write command is large, the data of the write command is stored in the first register 122 because the data of the write command may be regarded as having logical address spatial locality. When the data sequentially stored in the first register 122 fills the storage space of the first register 122 and there is no more storage space in the first register 122, the controller may program the data, stored in the first register 122, into the physical page 142, and may then flush the first register 122.

When the size of the data of the write command is smaller than the threshold size associated with the size of the m logical pages, the controller performs an operation based on the first register 122 or the second register 124 depending on the logical address locality condition. When the size of the data of the write command is small but the data of the write command has logical address spatial locality (the logical address of the data stored in the first register 122 and the logical address of the data of the write command meet the logical address locality condition), the data of the write command is sequentially stored in the first register 122.

In contrast, when the size of the data of the write command is small and the data of the write command does not have logical address spatial locality (the logical address of the data stored in the first register 122 and the logical address of the data of the write command do not meet the logical address locality condition), the data of the write command is sequentially stored in the second register 124.

When the data stored in the first register 122 or the second register 124 fills the size of the m logical pages and there is no sufficient free space in the first register 122 or the second register 124, the controller programs the data, stored in the first register 122 or the second register 124, into the physical page 142, and deletes the data stored in the first register 122 or the second register 124 (the first register 122 or the second register 124 is flushed). In this case, whether or not there is no sufficient free space in the first register 122 or the second register 124 may be determined not only by determining whether or not the storage space of the first register 122 or the second register 124 is completely filled but also by comparing the space utilization of the data stored in the register 122 or the second register 124 with the threshold size associated with the size of the m logical pages.

When the data stored in the second register 124 does not correspond to the size of the m logical pages but a predetermined idle time condition is met by taking into consideration temporal locality, the data may be programmed into the physical page 142, and the second register 124 may be flushed. In this case, the predetermined idle time condition may be set to a case in which a predetermined threshold idle time has elapsed after the data stored in the second register 124 is updated or a case in which the number of times the data of the write command is transferred to the first register 122 after the data stored in the second register 124 is updated is equal to or larger than a predetermined threshold idle number (x).

In an embodiment, the settings of the first register 122 and the second register 124 may be reversed under a specific condition. For example, the write data of a newly received write operation may be burst data the size of which is equal to or larger than 8 kB, but the logical address of the data stored in the first register 122 and the logical address of the write data may not meet the logical address locality condition. In this case, the controller may select any one of the first register 122 and the second register 124 as a victim register. When the first register 122 is selected as a victim register, the data stored in the first register 122 may be programmed into the physical page 142, and the first register 122 may be flushed. In contrast, when the second register 124 is selected as a victim register, the data stored in the second register 124 may be programmed into the physical page 142, and the second register 124 may be flushed.

The victim may be selected based on which of the data stored in the first register 122 and the data stored in the second register 124 is larger. When the size of the data stored in the first register 122 and the size of the data stored in the second register 124 are the same, the first register 122 may have priority. When the second register 124 is selected as the victim, the settings of the first register 122 and the second register 124 are changed thereafter, and thus the second register 124 may operate as a criterion for the determination of logical address locality, like the previous first register 122. In this case, the operations of the first register 122 and the second register 124 described above may be applied without change based on the reversed settings.

Although the page buffer 130 is shown in FIG. 2 for convenience of description, the function of the page buffer 130 may be performed by the operation of the first register 122 or the second register 124 in an embodiment, and thus an embodiment in which the page buffer 130 is omitted may also be implemented.

FIG. 3 shows an example of pseudo-code which implements a method of operating a non-volatile memory device using page collection mapping according to an embodiment of the present invention.

FIG. 4 shows an example of pseudo-code showing one step of the operating method of FIG. 3 in greater detail.

Referring to FIG. 3, an example of a write operation is introduced. A write operation designates a logical page address (a Logical Page Number (LPN)) at which data is stored in a host system/file system, the data, and the size (SIZE) of the data.

In a write operation, when the logical page address of the data stored in the first register 122 and the LPN designated by the input of the write operation are the same (see the second line), control may be performed by the controller of the flash translation layer (FTL) such that the data of the write operation is stored in the first register 122 (see the third line). In this case, when the first register 122 is fully filled with data and there is no more space for storing data (see the fourth line), control may be performed by the controller of the flash translation layer (FTL) such that the data stored in the first register 122 is stored in the physical page 142 of the flash memory (see the fifth line) and the first register 122 is flushed (see the sixth line). In this case, although whether or not the logical address of the data stored in the first register 122 and the LPN designated by the input of the write operation are the same is shown as being checked in the second line in the embodiment of FIG. 3, this is merely an embodiment. According to another embodiment of the present invention, a setting may be made such that when the difference between the logical address of the data stored in the first register 122 and the LPN designated by the input of the write operation falls within a predetermined range, a logical address locality condition is met.

In the write operation, when the logical address locality condition is not met because the logical page address of the data stored in the first register 122 and the LPN designated by the input of the write operation are not the same (see the seventh line), control may be performed by the controller of the flash translation layer (FTL) such that the data of the write operation is stored in the second register 124. In this case, when the second register 124 is fully filed with data and there is no sufficient space for storing data (see the ninth line), control may be performed by the controller of the flash translation layer (FTL) such that the data stored in the second register 124 is stored in the physical page 142 of the flash memory (see the tenth line) and the second register 124 is flushed (see the eleventh line).

To check whether or not an idle time condition is met in the case where the second register 124 has a space for the storage of data, the controller of the flash translation layer (FTL) may execute an idle check 2nd register operation described in the twelfth line.

Referring to FIG. 4, the controller of the flash translation layer (FTL) may determine whether or not a predetermined threshold idle time 'idle-time' has elapsed after the second register 124 is updated, or whether or not the number of times the data stored in the second register 124 has not been updated ('2nd register non-update') in spite of the fact that write operations are performed is equal to or larger than 'x' (the first line).

It may be assumed that the number of times the data stored in the second register 124 has not been updated ('2nd register non-update') in spite of the fact that write operations were performed is the same as the number of times the data of a write command has been transferred to the first register 122 after the data stored in the second register 124 was updated.

When the second register 124 meets an idle time condition in the first line of FIG. 4, the controller of the flash translation layer (FTL) may control the second register 124 and the flash translation layer FTL to store the data, stored in the second register 124, in the physical page 142 of the flash memory (see the second line) and flush the second register 124 (see the third line).

The method of operating a non-volatile memory device according to an embodiment of the present invention may be implemented in the form of program instructions, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

However, the present invention is not limited to the embodiments. Like reference symbols in the drawings designate like components. The lengths, heights, sizes, widths, etc. introduced in the embodiments and drawings of the present invention may be exaggerated to help to understand.

Although the present invention has been described with reference to specific details, such as the specific components, and the limited embodiments and drawings, these are provided merely to help a general understanding of the present invention, and the present invention is not limited thereto. Furthermore, those having ordinary knowledge and/or skill in the technical field to which the present invention pertains may make various modifications and variations from the above detailed description.

According to the present invention, the non-volatile memory device of the present invention can provide an effective page collection mapping technique which is capable of dealing with even a case in which the data of write commands transmitted from a host system, a file system, or an operating system is frequent updates of the system in a flash memory device having a multi-level high data density.

According to the present invention, there are provided the flash translation layer (FTL) which efficiently manages a flash memory device having a multi-level high data density by taking into consideration the situation of actual write operations in which write commands are frequently related to the update information of a system and the method of operating the flash memory device by using the flash translation layer (FTL).

According to the present invention, the number of unnecessary write operations can be reduced and space utilization can be increased in a flash memory device having a multi-level high data density by using registers having a parallel dual structure in an FTL level.

According to the present invention, the problem caused by the limitation of the update of a cache/register can be solved by proposing the criterion for the determination of the idle time of a cache/register.

According to the present invention, service life can be increased in a flash memory device having a multi-level high data density by taking into consideration both the spatial locality and temporal locality of write data in an FTL level.

Therefore, the spirit of the present invention should not be defined based only on the described embodiments, and not only the attached claims but also all equivalent to the claims should be construed as falling within the scope of the spirit of the present invention.

What is claimed is:

1. A non-volatile memory device in which a plurality of logical pages are stored in a single physical page, the non-volatile memory device comprising:
   a plurality of registers configured to:
      be included in a flash translation layer (FTL); and
      store at least part of data of a write command based on the write command received from a file system; and
   a controller configured to control operations of the plurality of registers based on the write command received from the file system,
   wherein each of the plurality of registers is further configured to have a storage space associated with a size of the plurality of logical pages, and the plurality of registers further comprise:
      a first register configured to store data which meets a logical address locality condition; and
      a second register configured to store data which does not meet the logical address locality condition,
   wherein each of the first register and the second registers is further configured to have a storage space associated with the size of the plurality of logical pages, and
   wherein the controller is further configured to:
      when a size of the data of the write command is equal to or larger than a threshold size associated with the size of the plurality of logical pages, program the data of the write command into a physical block of the non-volatile memory device;
      when the size of the data of the write command is smaller than a threshold size associated with the size of the plurality of logical pages, store the data of the write command in the plurality of registers;

determine a resetting condition is affirmative when the size of the data of the write command is equal to or larger than the threshold size associated with the size of the plurality of logical pages and the logical address of the data of the write command and the logical address of the data stored in the first register do not meet the logical address locality condition;

select any one of the first register and the second register when the resetting condition is affirmative;

program data, stored in the selected register, into the physical block of the non-volatile memory device when the resetting condition is affirmative;

flush the data stored in the selected register;

store the data of the write command in the selected register;

reverse settings of the first and second registers when the second register is selected; and then determine whether or not a logical address of data of a new write command received from the file system meets a logical address locality condition through comparison with the logical address of the data stored in the selected second register.

2. The non-volatile memory device of claim 1, wherein:
the controller is further configured to, when a logical address of the data of the write command and a logical address of data stored in the first register meet the logical address locality condition, store the data of the write command, received from the file system, in the first register; and the controller is further configured to, when a logical address of the data of the write command and a logical address of data stored in the first register do not meet the logical address locality condition, store the data of the write command in the second register.

3. The non-volatile memory device of claim 2, wherein when storing the data of the write command in the first register because the logical address of the data of the write command and the logical address of the data stored in the first register meet the logical address locality condition, the controller is further configured to, when there is no sufficient space to store the data of the write command in the first register:

program the data, stored in the first register, into the physical block of the non-volatile memory device;

flush the data stored in the first register; and store the data of the write command in the first register.

4. The non-volatile memory device of claim 2, wherein when storing the data of the write command in the second register because the logical address of the data of the write command and the logical address of the data stored in the first register do not meet the logical address locality condition, the controller is further configured to, when there is no sufficient space to store the data of the write command in the second register:

program the data, stored in the second register, into the physical block of the non-volatile memory device;

flush the data stored in the second register; and store the data of the write command in the second register.

5. The non-volatile memory device of claim 4, wherein when storing the data of the write command in the second register because the logical address of the data of the write command and the logical address of the data stored in the first register do not meet the logical address locality condition, the controller is further configured to, when the second register meets an idle time condition:

program the data, stored in the second register, into the physical block of the non-volatile memory device;

flush the data stored in the second register; and store the data of the write command in the second register.

6. The non-volatile memory device of claim 5, wherein the idle time condition is a case in which a predetermined threshold idle time has elapsed after the data stored in the second register is updated, or a case in which a number of times the data of the write command is transferred to the first register after the data stored in the second register is updated is equal to or larger than a predetermined threshold idle number.

7. A method of operating a non-volatile memory device in which a plurality of logical pages are stored in a single physical page, comprising:

storing, by a controller, data of a write command, received from a file system, in a first register included in a flash translation layer (FTL) when a logical address of the data of the write command and a logical address of data stored in the first register meet a logical address locality condition and a size of the data of the write command is smaller than a threshold size associated with a size of the plurality of logical pages;

storing, by the controller, the data of the write command in a second register included in the FTL when the logical address of the data of the write command and the logical address of data stored in the first register do not meet the logical address locality condition and the size of the data of the write command is smaller than the threshold size associated with the size of the plurality of logical pages;

programming, by the controller, the data of the write command into a physical block of the non-volatile memory when the size of the data of the write command is equal to or larger than the threshold size associated with the size of the plurality of logical pages;

determining, by the controller, a resetting condition is affirmative when the logical address of the data of the write command and the logical address of data stored in the first register do not meet the logical address locality condition and the size of the data of the write command is equal to or larger than the threshold size associated with the size of the plurality of logical pages;

programming data, by the controller, stored in the second register, into the physical block of the non-volatile memory device and flushing the data stored in the second register when the resetting condition is affirmative;

storing, at least part of the data of the write command in the second register when the resetting condition is affirmative;

reversing, by the controller, settings of the first register and the second register when the resetting condition is affirmative; and then determining, by the controller, whether or not a logical address of data of a new write command received from the file system meets a logical address locality condition through comparison with the logical address of the data stored in the second register.

8. The method of claim 7, wherein the storing the data of the write command in the second register comprises, when there is no sufficient space to store the data of the write command in the second register:

programming data, stored in the second register, into the physical block of the non-volatile memory device;

flushing the data stored in the second register; and storing the data of the write command in the second register.

9. The method of claim 8, wherein the storing the data of the write command in the second register further comprises, when the second register meets an idle time condition, programming the data, stored in the second register, into the physical block of the non-volatile memory device.

* * * * *